(12) United States Patent
Jun et al.

(10) Patent No.: US 11,012,372 B2
(45) Date of Patent: May 18, 2021

(54) ELECTRONIC APPARATUS AND METHOD FOR CONTROL THEREOF

(71) Applicant: SAMSUNG ELECTRONICS CO., LTD., Suwon-si (KR)

(72) Inventors: Hae-sik Jun, Suwon-si (KR); Won-yong Kim, Seoul (KR); Ho-sung Kim, Seoul (KR); Jae-chul Yang, Anyang-si (KR); Sang-gyu Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 15/945,287

(22) Filed: Apr. 4, 2018

(65) Prior Publication Data
US 2018/0287962 A1 Oct. 4, 2018

(30) Foreign Application Priority Data

Apr. 4, 2017 (KR) .................. 10-2017-0043708

(51) Int. Cl.
| | | |
|---|---|---|
| *H04L 12/911* | (2013.01) | |
| *H04L 29/08* | (2006.01) | |
| *B60R 16/023* | (2006.01) | |

(52) U.S. Cl.
CPC .......... *H04L 47/821* (2013.01); *H04L 67/141* (2013.01); *H04L 67/303* (2013.01);
(Continued)

(58) Field of Classification Search
CPC ..... B60R 16/023; G06F 1/1626; G06F 21/31; H04L 47/821; H04L 67/04; H04L 67/12;
(Continued)

(56) References Cited

U.S. PATENT DOCUMENTS 9,332,551 B2  3/2016 Wells
9,426,153 B2  8/2016 Kim et al.
(Continued)

FOREIGN PATENT DOCUMENTS

KR  10-2007-0040788 A  4/2007
KR  10-1151150 B1  6/2012
(Continued)

OTHER PUBLICATIONS

Written Opinion (PCT/ISA/237) dated Jul. 16, 2018 issued by the International Searching Authority in International Application No. PCT/KR2018/003988.
(Continued)

*Primary Examiner* — Clayton R Williams
*Assistant Examiner* — Michael Li
(74) *Attorney, Agent, or Firm* — Sughrue Mion, PLLC

(57) ABSTRACT

An electronic apparatus and a method for controlling the same are provided. The method includes executing an application; acquiring a resource configuration corresponding to the application; first identifying an external electronic apparatus from among a plurality of external electronic apparatuses based on preference information, the first identifying being in response to the resource configuration containing pre-stored information relating to the plurality of external electronic apparatuses; second identifying whether the external electronic apparatus is available; connecting to the external electronic apparatus; and sending a message regarding the application to the external electronic apparatus.

20 Claims, 14 Drawing Sheets

(52) U.S. Cl.
CPC ............ *B60R 16/023* (2013.01); *H04L 67/12* (2013.01); *H04L 67/143* (2013.01)

(58) Field of Classification Search
CPC ... H04L 67/141; H04L 67/143; H04L 67/303; H04N 21/41407
See application file for complete search history.

(56) References Cited

U.S. PATENT DOCUMENTS

| | | | |
|---|---|---|---|
| 2002/0143805 A1* | 10/2002 | Hayes | G06F 1/1626 345/169 |
| 2006/0037022 A1 | 2/2006 | Byrd et al. | |
| 2006/0291462 A1 | 12/2006 | Alex et al. | |
| 2013/0326583 A1* | 12/2013 | Freihold | G06F 3/04815 726/3 |
| 2014/0013332 A1 | 1/2014 | Wei et al. | |
| 2017/0017451 A1 | 1/2017 | Sathyanarayana Raghu et al. | |
| 2017/0018002 A1* | 1/2017 | Champy | H04N 21/41407 |

FOREIGN PATENT DOCUMENTS

| | | |
|---|---|---|
| KR | 10-2016-0037987 A | 4/2016 |
| KR | 10-2017-0009749 A | 1/2017 |
| WO | 2005/096143 A1 | 10/2005 |
| WO | 2016/173642 A1 | 11/2016 |

OTHER PUBLICATIONS

International Search Report (PCT/ISA/210) dated Jul. 16, 2018 issued by the International Searching Authority in International Application No. PCT/KR2018/003988.

Communication dated Jan. 27, 2021 by the Korean Intellectual Property Office in corresponding Korean Application No. 10-2017-0043708.

* cited by examiner

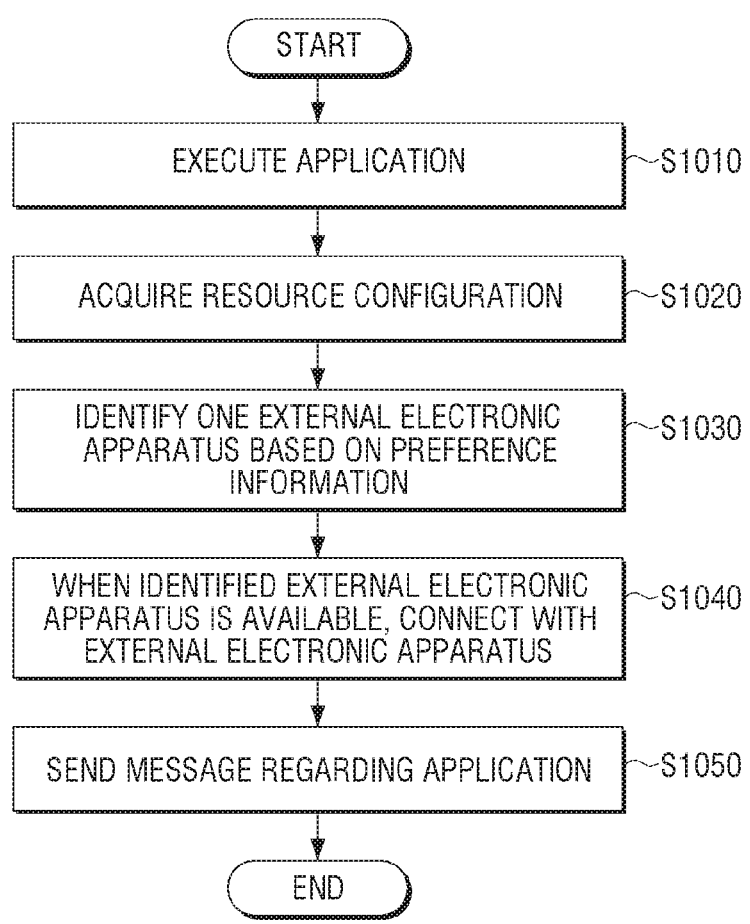

ELECTRONIC APPARATUS AND METHOD FOR CONTROL THEREOF

CROSS-REFERENCE TO RELATED APPLICATION

This application is based on and claims priority under 35 U.S.C. § 119 to Korean Patent Application No. 10-2017-0043708, filed on Apr. 4, 2017 in the Korean Intellectual Property Office, the disclosure of which is incorporated herein by reference in its entirety.

BACKGROUND

1. Field

The disclosure relates to an electronic apparatus and a method for controlling the same, and more particularly, to an electronic apparatus for selecting an external electronic apparatus to connect to according to a preference condition and using a resource of the connected external electronic apparatus, and a method for controlling the electronic apparatus.

2. Description of Related Art

Recently, distribution of user terminals, such as a smartphone, a tablet personal computer (PC), and the like, has expanded, and users of the terminal are able to use a variety of applications. In addition, a user may connect a user terminal to an external electronic apparatus and use a hardware function or software function of the external electronic apparatus.

However, in order to use the hardware function or software function of the external electronic apparatus, an application must be downloaded and installed, and a process is required for connecting the user terminal and the external electronic apparatus. For example, in a case in which the user wishes to use a display of an external electronic apparatus through a Wi-Fi connection, the user may access the external electronic apparatus via a standard screen share protocol and the like, and then use a screen of the external electronic apparatus.

In this case, it is necessary for the user to install a separate application for each application or for each external electronic apparatus, which is inconvenient. In addition, in a case in which the user terminal and an external electronic apparatus are connected with each other, in order for the external electronic apparatus to perform a function, the user terminal must send all data corresponding to the function to be used to the external electronic apparatus. In this case, because a large amount of data is transmitted, reactivity of the external electronic apparatus is reduced and a speed of a function to be used by the user is deteriorated.

SUMMARY

One or more embodiments of the present disclosure provide a resolution of such aforementioned problems, that is, to simplify a user operation by selecting one of a plurality of available external electronic apparatuses according to a preference condition and connecting with the selected external electronic apparatus, and increasing a reactivity of the external electronic apparatus and an execution speed of an application by controlling the external electronic apparatus by sending messages.

According to embodiments of the disclosure, a method for controlling an electronic apparatus is provided. The method includes: executing an application; acquiring a resource configuration corresponding to the application; first identifying an external electronic apparatus from among a plurality of external electronic apparatuses based on preference information, the first identifying being in response to the resource configuration containing pre-stored information relating to the plurality of external electronic apparatuses; second identifying whether the external electronic apparatus is available; connecting to the external electronic apparatus; and sending a message regarding the application to the external electronic apparatus.

The preference information may include first priority information, second priority information, and third priority information, and the first identifying may include identifying a highest priority external electronic apparatus based on the preference information as the external electronic apparatus.

The first priority information may indicate a first external electronic apparatus corresponding to user preference information, the second priority information may indicate a second external electronic apparatus corresponding to application preference information, and the third priority information may indicate a third external electronic apparatus corresponding to basic preference information.

The first external electronic apparatus may correspond to at least one from among an external electronic apparatus registered with the external electronic apparatus and an external electronic apparatus which has an authentication history in the external electronic apparatus, the second external electronic apparatus may correspond to a resource priority included in the application, the third external electronic apparatus may correspond to an available external electronic apparatus, and the resource priority may be pre-stored in the application.

The resource configuration may include at least one from among the preference information, a mapping table, and information relating to an application execution environment, and the mapping table may map a resource of the external electronic apparatus corresponding to a resource of the electronic apparatus.

The first identifying may further include: searching for a plurality of found external electronic apparatuses including a resource required to execute the application in response to information relating to the plurality of external electronic apparatuses not being present in the resource configuration; identifying the external electronic apparatus from among the plurality of found external electronic apparatuses based on the preference information; and generating a mapping table corresponding to the one external electronic apparatus.

The connecting may include determining whether a power state of the external electronic apparatus is on and identifying whether the external electronic apparatus is connected with another electronic apparatus.

The method may further include: identifying whether an authority to abort connection between the external electronic apparatus and the another electronic apparatus is present in response to the external electronic apparatus being connected with the another electronic apparatus; and aborting connection between the another electronic apparatus and the external electronic apparatus and connecting with the external electronic apparatus in response to the authority being present.

The connecting may further include connecting with a lower priority external electronic apparatus in response to the external electronic apparatus not being available.

The sending may include: sending a mapping table of a resource of the external electronic apparatus; and sending one from among a lock message to prohibit use of another electronic apparatus and a share message to share the one external electronic apparatus with another device in response to being connected with the one external electronic apparatus.

In accordance with embodiments of the disclosure, there is provided an electronic apparatus including: an input interface configured to receive a user command; a processor configured to execute an application in response to the user command, to acquire a resource configuration corresponding to the application, and identify an external electronic apparatus from among a plurality of external electronic apparatuses based on preference information, the processor identifying the external electronic apparatus in response to pre-stored information relating to the plurality of external electronic apparatuses being present in the resource configuration; and a communication interface configured to connect with the external electronic apparatus when the external electronic apparatus is available, and the processor is further configured to control the communication interface to send a message regarding the application to the external electronic apparatus.

The preference information may include first priority information, second priority information, and third priority information, and the processor may be further configured to identify a highest priority external electronic apparatus based on the preference information as the external electronic apparatus.

The first priority information may indicate a first external electronic apparatus corresponding to user preference information, the second priority information may indicate a second external electronic apparatus corresponding to application preference information, and the third priority information may indicate a third external electronic apparatus corresponding to basic preference information.

The first external electronic apparatus may correspond to at least one from among an external electronic apparatus registered with the external electronic apparatus and an external electronic apparatus which has an authentication history in the external electronic apparatus, the second external electronic apparatus may correspond to a resource priority included in the application, the third external electronic apparatus may correspond to an available external electronic apparatus, and the resource priority may be pre-stored in the application.

The resource configuration may include at least one from among the preference information, a mapping table, and information relating to an application execution environment, and the mapping table may map a resource of the external electronic apparatus corresponding to a resource of the electronic apparatus.

The processor may be further configured to search for a plurality of found external electronic apparatuses including a resource required to execute the application in response to information relating to the plurality of external electronic apparatuses not being present in the resource configuration, identify the external electronic apparatus from among the plurality of found external electronic apparatuses based on the preference information, and generate a mapping table corresponding to the one external electronic apparatus.

The processor may be further configured to determine whether a power state of the external electronic apparatus is on and identify whether the external electronic apparatus is connected with another electronic apparatus.

The processor may be further configured to identify whether an authority to abort connection between the external electronic apparatus and the another electronic apparatus is present in response to the external electronic apparatus being connected with the another electronic apparatus, and abort connection between the another electronic apparatus and the external electronic apparatus and connect with the external electronic apparatus in response to the authority being present.

The processor may be further configured to control the communication interface to connect with a lower priority external electronic apparatus in response to the external electronic apparatus not being available.

The processor may be further configured to control the communication interface to send a mapping table of a resource of the external electronic apparatus, and control the communication interface to send one from among a lock message to prohibit use of another electronic apparatus and a share message to share the one external electronic apparatus with another device in response to connecting with the one external electronic apparatus.

BRIEF DESCRIPTION OF THE DRAWINGS

The above and/or other aspects will become more apparent by reference to embodiments which are illustrated in the appended drawings. Understanding that these drawings depict only embodiments and are not therefore to be considered to be limiting of the scope of the disclosure, the principles herein are described and explained with additional specificity and detail via the use of the accompanying drawings, in which:

FIG. 10 is a flowchart illustrating a method for controlling an electronic apparatus, according to an embodiment.

DETAILED DESCRIPTION

Figure 1:
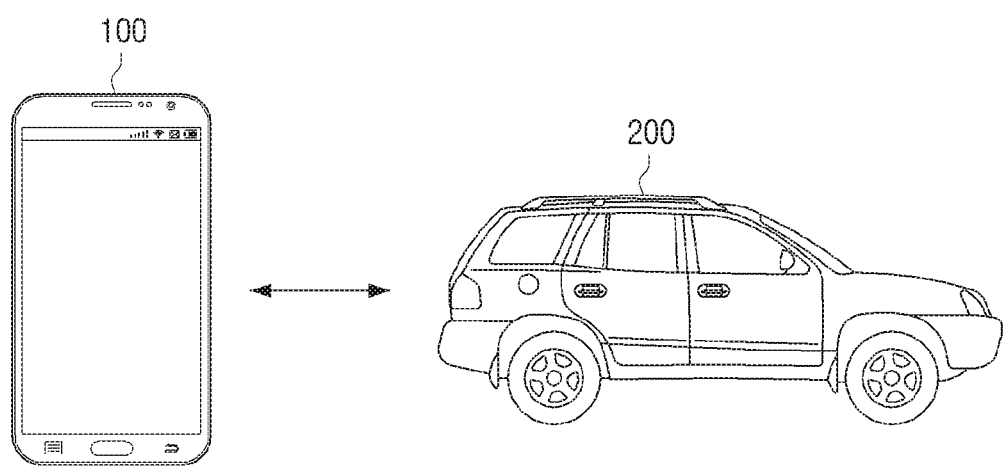
FIG. 1 is a diagram illustrating an example of an electronic apparatus and an external audio output apparatus system, according to an embodiment.

Certain embodiments will now be described in greater detail with reference to the accompanying drawings.

The terms used in the present disclosure are general terms which are widely used now and selected considering the functions of the present disclosure. However, the terms may vary depending on the intention of a person skilled in the art, a precedent, or the advent of new technology. In addition, in a special case, terms selected by the applicant may be used. In this case, the meaning of the terms will be explained in detail in the corresponding detailed descriptions. Accordingly, the terms used herein will be based on the meanings of the terms and overall contents of embodiments.

As embodiments may have a variety of modifications and several examples, certain embodiments will be exemplified in the drawings and described in detail in the description thereof. However, this does not necessarily limit the scope of the embodiments to a specific embodiment form. Instead, modifications, equivalents and replacements included in the disclosed concept and technical scope of this specification may be employed. While describing embodiments, if it is determined that the specific description regarding a known technology obscures the gist of the disclosure, the specific description is omitted.

As used herein, the terms "1st" or "first" and "2nd" or "second" may use corresponding components regardless of importance or order and are used to distinguish a component from another without limiting the components. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

According to embodiments, a "module" or "unit" performs at least one function or operation, and may be implemented as hardware or software, or a combination of hardware and software. Further, a plurality of 'modules' or a plurality of 'units' are integrated into at least one module except for the 'module' or 'unit' which needs to be implemented by specific hardware and thus may be implemented by at least one processor.

Throughout the embodiments, when a certain portion is stated as being "connected" with another, this means that the portion is not only "directly connected", but also "electrically connected" while being intervened by another element in the middle. In addition, it means that a portion is "physically connected" as well as "wirelessly connected". Further, when a certain portion is stated as "comprising" a certain element, unless otherwise stated, this means that the certain portion may include another element, rather than foreclosing the same.

The above and other aspects of the present disclosure will become more apparent by describing in detail embodiments thereof with reference to the accompanying drawings. However, embodiments may be realized in a variety of different configurations, and not limited to descriptions provided herein. Further, those that are irrelevant with the description are omitted so as to describe embodiments more clearly, and similar drawing reference numerals are used for the similar elements throughout the description.

FIG. 1 is a diagram illustrating an example of an electronic apparatus and an external audio output apparatus system, according to an embodiment;

A system according to FIG. 1 may include an electronic apparatus 100 and an external electronic apparatus 200.

In this regard, the electronic apparatus 100 according to an embodiment may have an environment for executing an application or a service. The electronic apparatus 100 may include a smartphone, a tablet personal computer (PC), a mobile phone, a video phone, an e-book reader, a desktop personal computer (PC), a laptop personal computer (PC), a netbook computer, a workstation, a personal digital assistant (PDA), a portable multimedia player (PMP), and the like.

According to an embodiment of the present disclosure, the external electronic apparatus 200 may be an external electronic apparatus of various forms. For example, the external electronic apparatus 200 may be an electronic apparatus 100 as described above, or may include a vehicle navigation, a smart television, a smart refrigerator or various IoT devices.

In the present disclosure, it is assumed that the external electronic apparatus 200 is a navigation provided in a vehicle. However, the external electronic apparatus 200 is not limited to a vehicle navigation, and may be implemented as various electronic apparatuses described above.

Figure 2A:
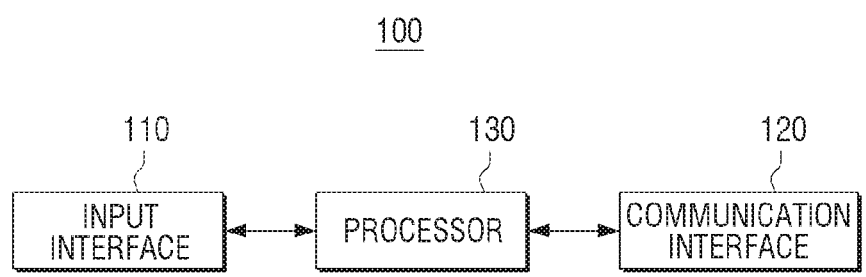
FIGS. 2A and 2B are block diagrams illustrating a configuration of an electronic apparatus, according to an embodiment.
Figure 2B:
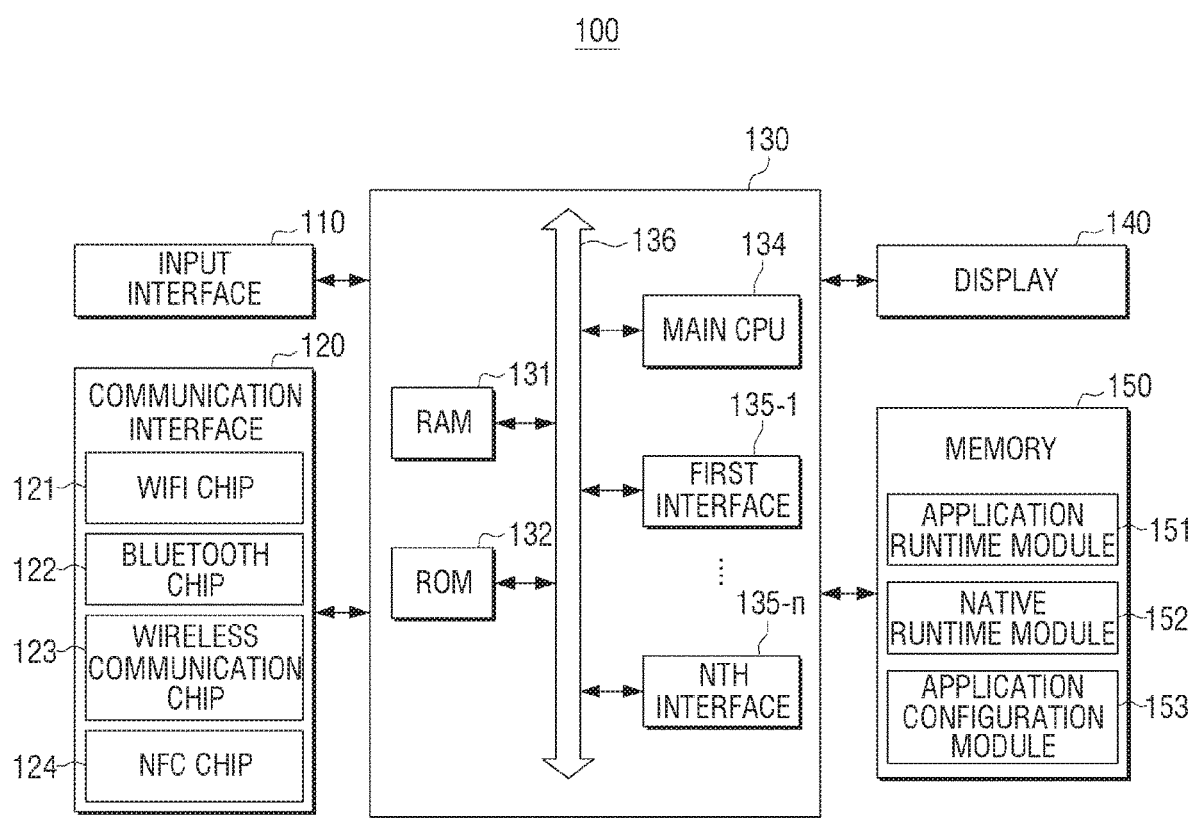

FIGS. 2A and 2B are block diagrams illustrating a configuration of an electronic apparatus, according to an embodiment.

As illustrated in FIG. 2A, the electronic apparatus 100 includes an input interface 110, a communication interface 120, and a processor 130.

The input interface 110 may receive a user command. For example, a user may transmit an input for executing a particular application or an input for executing various functions to use the application to the processor 130.

The communication interface 120 may perform communication with the external electronic apparatus 200. For example, the communication interface 120 may send a message for executing a function of a particular application to the external electronic apparatus 200, and receive a message associated with execution of an application from the external electronic apparatus 200.

The processor 130 may control the overall operation of the electronic apparatus 100. For example, in a case in which the input interface 110 receives a user command, the processor 130 may execute a particular application in response to the user command. The processor 130 may acquire a resource configuration of the executed application. In this regard, the resource configuration may include an environment in which an application is executed, preference information of the application, information relating to an apparatus using a mapping table and the application, and information relating to various software and hardware required to execute the application.

In this case, the preference information refers to a condition for selecting one external electronic apparatus (200) from among external electronic apparatuses 200 capable of executing a navigation application.

In addition, the mapping table refers to a table generated by mapping a resource required for executing an application to a resource of the corresponding external electronic apparatus 200. In addition, the mapping table may include data relating to a detail of a previous setting. For example, the mapping table may include user information, application information, an external electronic apparatus information, resource information, and the like.

In addition, the information relating to various software and hardware required to execute the application may, for example, include a hardware, such as a display which is used by a navigation application, a touch input and a key input interface, or may include a software required to execute the navigation application.

The processor 130 may, in response to a plurality of pre-stored external electronic apparatuses being present in a resource configuration, identify one external electronic apparatus 200 from among the plurality of external electronic apparatuses 200 based on preference information.

The processor 130 may identify an external electronic apparatus 200 corresponding to have a highest priority from among the preference information as one external electronic apparatus. In this case, the preference information may include first priority information, second priority information and third priority information.

For example, the first priority information may include information relating to an external electronic apparatus corresponding to user preference information, and the second priority information may include information relating to an external electronic apparatus corresponding to application preference information. In addition, the third priority information may include information relating to an external electronic apparatus corresponding to basic preference information.

In this case, an external electronic apparatus 200 satisfying a user preference condition may be an external electronic apparatus which is registered in the electronic apparatus 100, or may be an external electronic apparatus which has records of authentication in the external electronic apparatus.

In addition, the external electronic apparatus corresponding to the application preference information is characterized in that it is determined according to a priority of resources included in the application, and the resource priority is characterized in that it is a priority which is pre-stored in the application.

In addition, an external electronic apparatus corresponding to the basic preference information may be an external electronic apparatus corresponding to the user preference information, and may, in response to an external electronic apparatus corresponding to the application preference information not being present, be an electronic apparatus which is determined according to a basic rule. In this case, the basic rule may be set in various manners. For example, the processor 130 may select an arbitrary, available external electronic apparatus 200, but is not limited thereto.

In a case in which the external electronic apparatus 200 is identified, the processor 130 may control the communication interface 120 to send a message relating to the application to the external electronic apparatus 200. In addition, the processor 130 may control the electronic apparatus 100 by using a message sent to the external electronic apparatus 200. For example, in a case in which the processor 130 sends a message for searching for a destination to the external electronic apparatus 200, an application executed in the electronic apparatus 100 may control the electronic apparatus 100 to search for a destination as well. In other words, the processor 130 may control both the electronic apparatus 100 and the external electronic apparatus 200 by using the same message.

In a case in which information relating to a plurality of pre-stored external electronic apparatuses not being present in the acquired resource configuration, the processor 130 may search for a plurality of external electronic apparatuses which include a resource required for executing an application. In this regard, the processor 130 may identify one external electronic apparatus 200 from among a plurality of retrieved external electronic apparatuses based on preference information, and generate a mapping table corresponding to the identified external electronic apparatus 200.

In a case in which an external electronic apparatus 200 for executing an application function of the electronic apparatus 100 being identified, the processor 130 may identify whether the external electronic apparatus 200 is available. For example, the processor 130 may identify whether a power of the external electronic apparatus 200 is turned on/off and whether the external electronic apparatus 200 is connected with another electronic apparatus.

In a case in which a power of the external electronic apparatus 200 is turned off, the processor 130 may identify that the corresponding external electronic apparatus 200 is not available and select an external electronic apparatus 200 of a next priority.

In a case in which a power of the external electronic apparatus 200 is turned on, the processor 130 may identify whether the external electronic apparatus 200 is connected with another electronic apparatus. In a case in which the external electronic apparatus 200 is not connected with another electronic apparatus, the processor 130 may control the communication interface 120 to be connected with the external electronic apparatus 200.

In a case in which the external electronic apparatus 200 is connected with another electronic apparatus, the processor 130 may identify whether it has an authority to stop connection between the external electronic apparatus 200 and the other electronic apparatus. In a case in which the processor 130 has an authority to terminate connection with the other electronic apparatus, the processor 130 may stop connection between the external electronic apparatus 200 and the other electronic apparatus, and may control the communication interface 120 to perform connection with the external electronic apparatus 200. In this regard, the processor 130 may identify whether the external electronic apparatus 200 has an access authority by using a user authentication process.

The authority to abort connection with another electronic apparatus may be an authority to designate the external electronic apparatus 200 to primarily connect with the electronic apparatus 100. Alternatively, the processor 130 may send a message informing that it will use the external electronic apparatus 200 to a user of the other electronic apparatus, and in response to the other electronic apparatus approving the use, use the external electronic apparatus. However, the example is not limited thereto, and various authorities to abort connection with the other electronic apparatus may exist.

In a case in which the electronic apparatus 100 is connected with the external electronic apparatus 200, the processor 130 may control the communication interface 120 to send a lock message to prohibit use of the other electronic apparatus or a share message for sharing the external electronic apparatus 200 with another device.

FIGS. 2A and 2B are block diagrams illustrating a detailed configuration of an electronic apparatus, according to an embodiment.

For example, the electronic apparatus 100 may further include a display 140 and a memory 150, in addition to the input interface 110, the communication interface 120, and the processor 130. However, the example is not limited thereto, and it is possible that a new element is added or omitted.

The input interface 110 may receive an input, such as a user command. For example, the input interface 110 may receive an application execution input, an application control input, and the like. In this regard, the input interface 110 may be implemented in various forms. For example, the input interface 110 may be implemented in the form of a key button, and may also be implemented as a touch input interface which is capable of being combined with a detector (not illustrated) and receiving a touch input of a user. However, the example is not limited thereto, and it may be configured to receive various inputs, such as a voice, motion and gesture of a user.

The communication interface 120 may include at least one of a Wi-Fi chip 121, a Bluetooth chip 122, a wireless communication chip 123, and a near field communication (NFC) chip 124. Specifically, Wi-Fi chip 121 and Bluetooth chip 122 may respectively perform the communication according to Wi-Fi communication method and Bluetooth communication method. In the case of using the Wi-Fi chip 121 or the Bluetooth chip 122, various connection information such as SSID and session key may be transmitted and received first, and various information may be transmitted and received after communication is established by using it. The wireless communication chip 123 refers to a chip that performs communication according to the various communication standards such as IEEE, Zigbee, 3rd Generation (3G), 3rd Generation Partnership Project (3GPP), Long Term Evolution (LTE), and so on. The NFC chip 124 may refer to a chip that operates in a NFC manner using a frequency band of 13.56 MHz among various RF-ID frequency bands such as 135 kHz, 13.56 MHz, 433 MHz, 860 to 960 MHz, and 2.45 GHz.

The communication interface 120 may perform communication with the external electronic apparatus 200. For example, the communication interface 120 may send a message for controlling an application by the external electronic apparatus 200.

The processor 130 may be configured to control an overall operation of the electronic apparatus 100 using various programs stored in the memory 150.

As illustrated in FIG. 2B, the processor 130 may include a RAM 131, a ROM 132, a CPU 134, first to nth interfaces 135-1 to 135-n, and a bus 136. The RAM 131, the ROM 132, the CPU 134, the first through n interfaces 135-1 through 135-n, etc. may be connected to each other via a bus 136.

The ROM 132 may store a command set, and the like for system booting. When a turn-on command is input and thus the electric power is supplied, the main CPU 134 may copy the stored O/S in the memory 150 to RAM 131 according to the commands stored in ROM 132, and boot the system by executing O/S. In response to the booting being completed, the main CPU 134 may copy various application programs stored in the memory 150 to the RAM 131, and execute the application programs copied to the RAM 131 to perform various operations.

The main CPU 134 accesses the memory 150 to perform booting using the OS stored in the memory 150. The main CPU 134 performs operations using a variety of programs, content, data, and the like, stored in the memory 150.

The first to the nth interface (135-1 to 135-n) are connected to the above-described various elements. One of the interfaces may be a network interface which is connected with an external device via a network.

The display 140 may output an image data. For example, the display 140 may display an application which is executed by the processor 130.

The memory 150 may store an operating system (O/S) for driving the electronic apparatus 100. In addition, according to an embodiment, various software programs or applications for operating the electronic apparatus 100 may be stored in the memory 150. Various information, such as various data which is input, set or generated while a program or an application is executed, and the like, may be stored in the memory 150.

In addition, according to various embodiments, the memory 150 may include various software modules for operating the electronic apparatus 100. The processor 130 may execute various software modules stored in the memory 150 and perform an operation of the electronic apparatus 100 according to the various embodiments.

To this end, the memory 150 may include a semiconductor memory, such as a flash memory and the like, or a magnetic storage medium, such as a hard disk and the like.

In addition, the memory 150 may include an application runtime module 151, a native runtime module 152, and an application configuration module 153. For example, the application runtime module 151 may store environment information for executing an application or a service, and the native runtime module 152 may include information for directly operating the electronic apparatus 100 or the external electronic apparatus 200. In other words, the processor 130 may control the native runtime module 151 for controlling an application, and the application module 151 may send a message to the native runtime module 152. The application configuration module 153 may include information relating to a mapping table and preference information.

In this regard, a message relating to a UI may be converted using a UI library stored in the application runtime module 151. For example, in a case in which an application control command is received, the processor 130 may convert a message corresponding to the control command by using the UI library. An external electronic apparatus 200 receiving the message may convert the message to a UI by using an application performance interface (API).

In a case in which it is set to use a resource of the electronic apparatus 100 or the external electronic apparatus 200, the processor 130 may send an event message to the application runtime module 151 every time an event occurs. The application run time module 151 may send the received event message to the native runtime module 152 of the external electronic apparatus 200 and execute a function corresponding to the event message.

As described above, the processor 130 does not send a data of a large size for controlling the external electronic apparatus 200, but may send a message of a small size corresponding to a function. Accordingly, a reactivity of the external electronic apparatus 200 is decreased.

Hereinafter, a connection process of an electronic apparatus 100 and an external electronic apparatus 200 will be described in detail with reference to FIGS. 3, 4, 5, 6, 7A, 7B, 7C, 8A and 8B.

Figure 3:
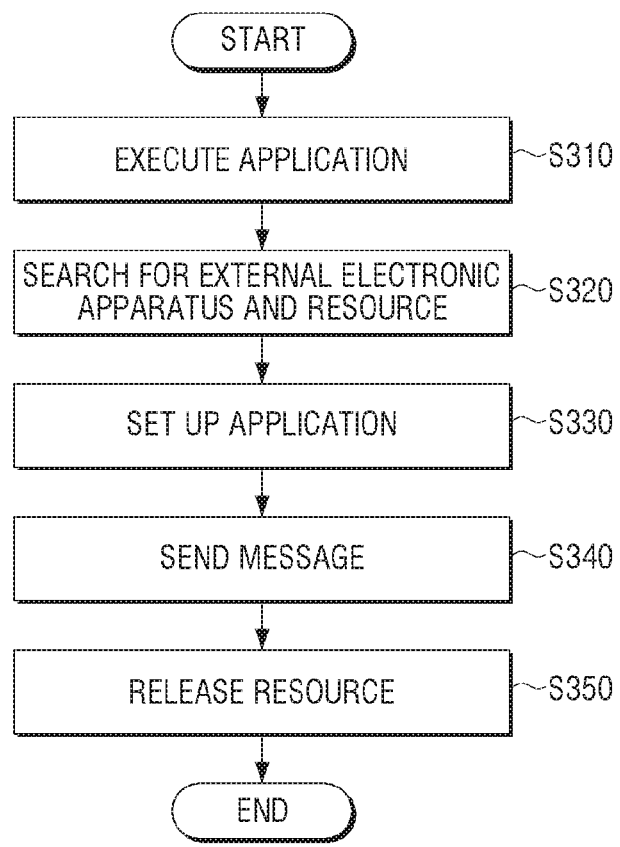
FIG. 3 is a flowchart illustrating a connection process of an electronic apparatus and an external electronic apparatus, according to an embodiment.

FIG. 3 is a flowchart illustrating a connection process of an electronic apparatus and an external electronic apparatus, according to an embodiment.

As illustrated in FIG. 3, a user may execute an application in the electronic apparatus 100 to use the application. At an application execution stage, at operation S310, the processor 130 may, when an application is executed, identify whether a previous resource configuration is present, and when the previous resource configuration is present, read the corresponding configuration. In this regard, the corresponding resource configuration may include a mapping table, a preference setting detail for external electronic apparatus search and automatic configuration, and information relating to an environment in which other applications are executed.

At a step of searching for an external electronic apparatus and resource, at operation S320, the processor 130 may, when a resource configuration is present, search for a plurality of external electronic apparatuses based on the resource configuration. For example, the processor 130 may identify whether it is possible to use a resource of a plurality of electronic apparatuses in which the resource configuration is present. In a case in which the resource of the plurality of external electronic apparatuses is not available, the processor may search for all devices that may be identified and reselect a necessary resource according to a preference condition. The preference condition will be described in detail below with reference to FIG. 4.

In a case in which a plurality of external electronic apparatuses are found, the processor 130 may select one external electronic apparatus 200 according to a preference condition. In a case in which an external electronic apparatus to which a connection attempt is to be made is selected, the processor 130 may control the communication interface 120 to send a lock message to the external electronic apparatus 200 so that the external electronic apparatus 200 is not used by other electronic apparatuses. However, the example is not limited thereto, and the processor 130 may also control the communication interface 120 to send a share message for sharing the external electronic apparatus 200 with other electronic apparatuses to the external electronic apparatus 200 according to a type of application. The detail will be described below with reference to FIG. 4.

At an application setup stage, at operation S330, in response to a resource of the selected external electronic apparatus 200 being obtained, the processor 130 may generate a mapping table for exchanging messages between the electronic apparatus 100 and a resource of the external electronic apparatus 200. For example, a software and hardware (touch screen, button and the like) required for executing a navigation application may be mapped to each other and stored in the mapping table. In other words, a software of the electronic apparatus 100 and a software of the external electronic apparatus 200 may be mapped to each other, and a touch screen of the electronic apparatus 100 and a touch screen of the external electronic apparatus 200 may be mapped to each other. The generated mapping table may be stored in the application configuration module 153. In addition, the same mapping table as the generated mapping table may be stored in the external electronic apparatus 200 as well. The information relating to the generated mapping table may be used when the electronic apparatus 100 and the external electronic apparatus 200 are connected with each other again.

At a message sending stage, at operation S340, the processor 130 may generate a message for using a function of a resource. The generated message may be sent using a mapping table of the electronic apparatus 100 and the external electronic apparatus 200.

In this regard, the message which is sent may include control information for using a resource of the external electronic apparatus 200. For example, in a case in which the electronic apparatus 100 is to display a content by using a display resource of the external electronic apparatus 200, the electronic apparatus 100 may send a message including information for generating the content.

For example, the electronic apparatus 100 may generate a message including information required for generating a content screen through a UI library included in the application runtime module 151. For example, in a case in which the electronic apparatus 100 sends a message associated with a navigation application, the message may include library information required for generating a navigation UI screen and the like.

An application performance interface (API) of the external electronic apparatus 200 that receives the generated message may generate a content screen by using information included in the message and display the generated content screen. For example, in a case in which the external electronic apparatus 200 receives a message including library information required for generating a navigation UI screen, the external electronic apparatus 200 may generate a navigation UI screen by using the received library information.

That is, the external electronic apparatus 200 may, instead of receiving a low data of a large capacity (for example, a data relating to a navigation UI screen itself) and displaying the received data as it is, receive a message including a data of a less capacity required for generating a content screen (for example, a data relating to library information required for generating a navigation UI screen) and generate a content screen according to the received information, and thus a quick reactivity is realized.

In this regard, a message may include a request message, a response message, an event message and an error message.

For example, a request message may be a message when there is a request to use a resource of the external electronic apparatus 200. As described above, the request message may include information for generating a low data. A response message may be a message that includes a control command with respect to a message received from the external electronic apparatus 200.

An event message may be a message relating to a variety of events occurring in a resource. For example, an event may be a UI event occurring on a display, a touch input event occurring in the touch input interface, and the like, but is not limited thereto, and an event message of various forms may exist. An error message may be a message relating to various errors occurring in the electronic apparatus 100 and the external electronic apparatus 200. In this regard, an event message or error message occurring in a resource may be sent to the electronic apparatus 100 through synchronous or asynchronous method. However, the example is not limited to the message of the types mentioned above, and the electronic apparatus 100 and the external electronic apparatus 200 may send or receive various forms of messages as necessary.

Meanwhile, a message may control the external electronic apparatus 200 but also may be used to control the electronic apparatus 100. For example, an application executed in the electronic apparatus 100 may be controlled by sending a message from within the electronic apparatus 100. In this regard, a message for controlling the electronic apparatus 100 may be sent as the external electronic apparatus 200 and a resource of the external electronic apparatus as key values.

At resource release stage, at operation S350, in a case in which the processor 130 no longer uses a resource of an application, such as when the application is terminated, the processor 130 may control the communication interface 120 to send a unlock message to the external electronic apparatus 200.

Figure 4:
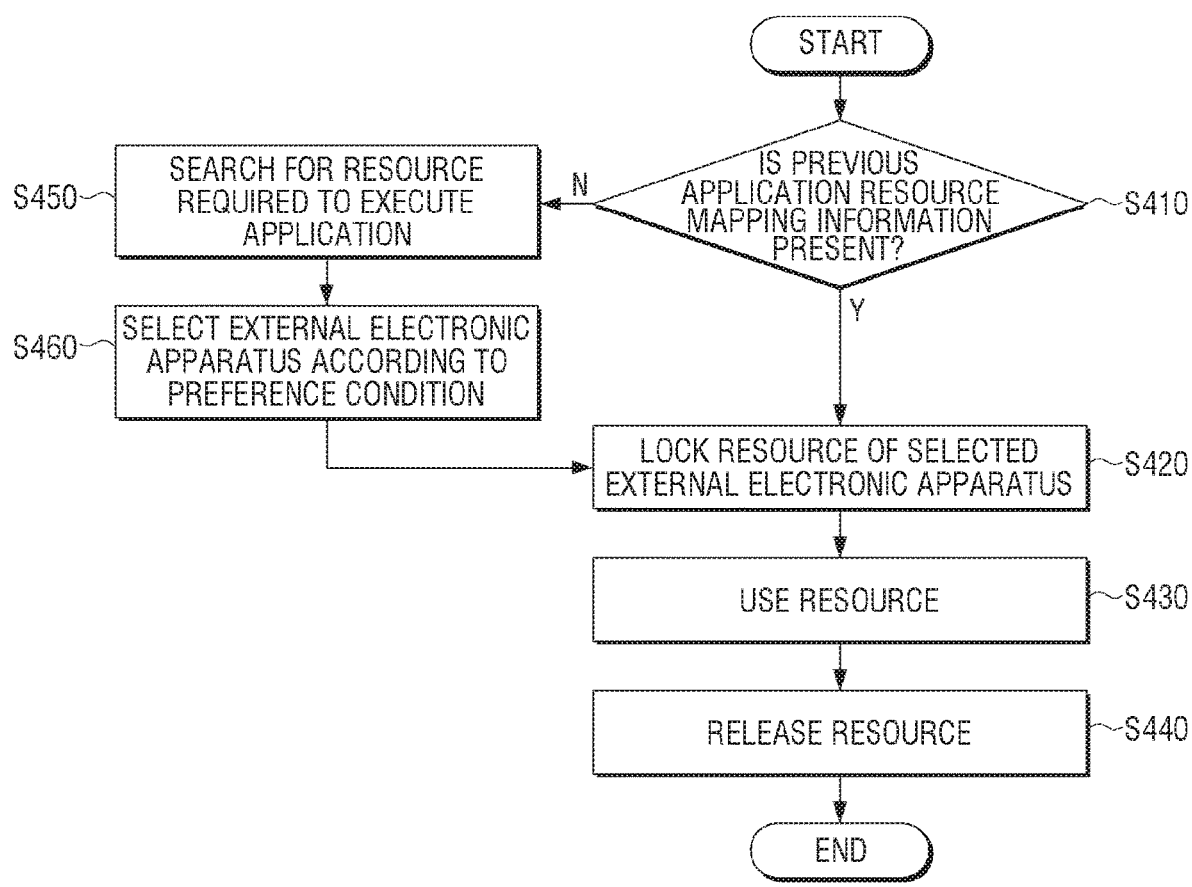
FIG. 4 is a flowchart illustrating a process of selecting an external electronic apparatus, according to an embodiment.

FIG. 4 is a flowchart illustrating a process of selecting an external electronic apparatus, according to an embodiment.

As illustrated in FIG. 4, in a case in which an application is executed and a resource configuration is read, a processor may identify whether mapping information of a resource of a previous application is present, at operation S410. For example, the processor 130 may identify whether a pre-stored mapping table is present in the resource configuration. When mapping information of the previous application resource is present, S410-Y, because a mapping table is already generated, the processor 130 may select an external electronic apparatus 200 corresponding to the mapping table. In this regard, in a case in which a mapping table regarding a plurality of external electronic apparatuses is present, the processor 130 may select one external electronic apparatus 200 from among the plurality of external electronic apparatuses by using preference information.

In a case in which mapping information of the previous application resource is not present, the processor may search for a resource required for executing an application, at operation S450. In this regard, the processor 130 may search for a plurality of available external electronic apparatuses based on the found resource. A method of identifying a plurality of available external electronic apparatuses will be described below with reference to FIG. 5.

The processor 130 may select one external electronic apparatus 200 from among the plurality of external electronic apparatuses by using preference information, at operation S460. In this regard, preference information is predetermined information, and the processor 130 may select an external electronic apparatus with higher priority as an external electronic apparatus 200 to be used. The preference information may include user preference information, application preference information, and basic preference information. The detail will be described below with reference to FIG. 6. In a case in which an external electronic apparatus 200 to be used is selected, the processor 130 may generate a mapping table to connect with and send messages to the external electronic apparatus 200. However, in a case in which a mapping table is already generated, this stage may be skipped.

In a case in which one of a plurality of external electronic apparatuses is selected, the processor 130 may control the communication interface to send a unlock message to the external electronic apparatus 200, at operation S420. However, as described above, instead of a unlock message, a share message may be sent as necessary. For example, in a case in which a meeting process application is executed, when an electronic apparatus of every person attending the meeting shares one external electronic apparatus 200, the processor 130 may control the communication interface 120 to send a share message to the external electronic apparatus 200.

The processor 130 may use a resource of the external electronic apparatus 200 by using a mapping table, at operation S430. For example, in a case in which the processor 130 is to use a resource of the external electronic apparatus 200, the processor 130 may control the communication interface 120 to send a required message to the external electronic apparatus 200. In addition, the communication interface 120 may receive the message from the external electronic apparatus 200 and send it to the processor 130. The processor 130 may execute a function of an application in response to the received message, or may control the communication interface 120 to resend the message to the external electronic apparatus 200 in response to the received message.

In a case in which the use of the application is ended, the processor 130 may control the communication interface 120 to send a unlock message to the external electronic apparatus 200. The external electronic apparatus 200 receiving the unlock message may receive a connection request from another electronic apparatus and may be connected with another electronic apparatus.

Figure 5:
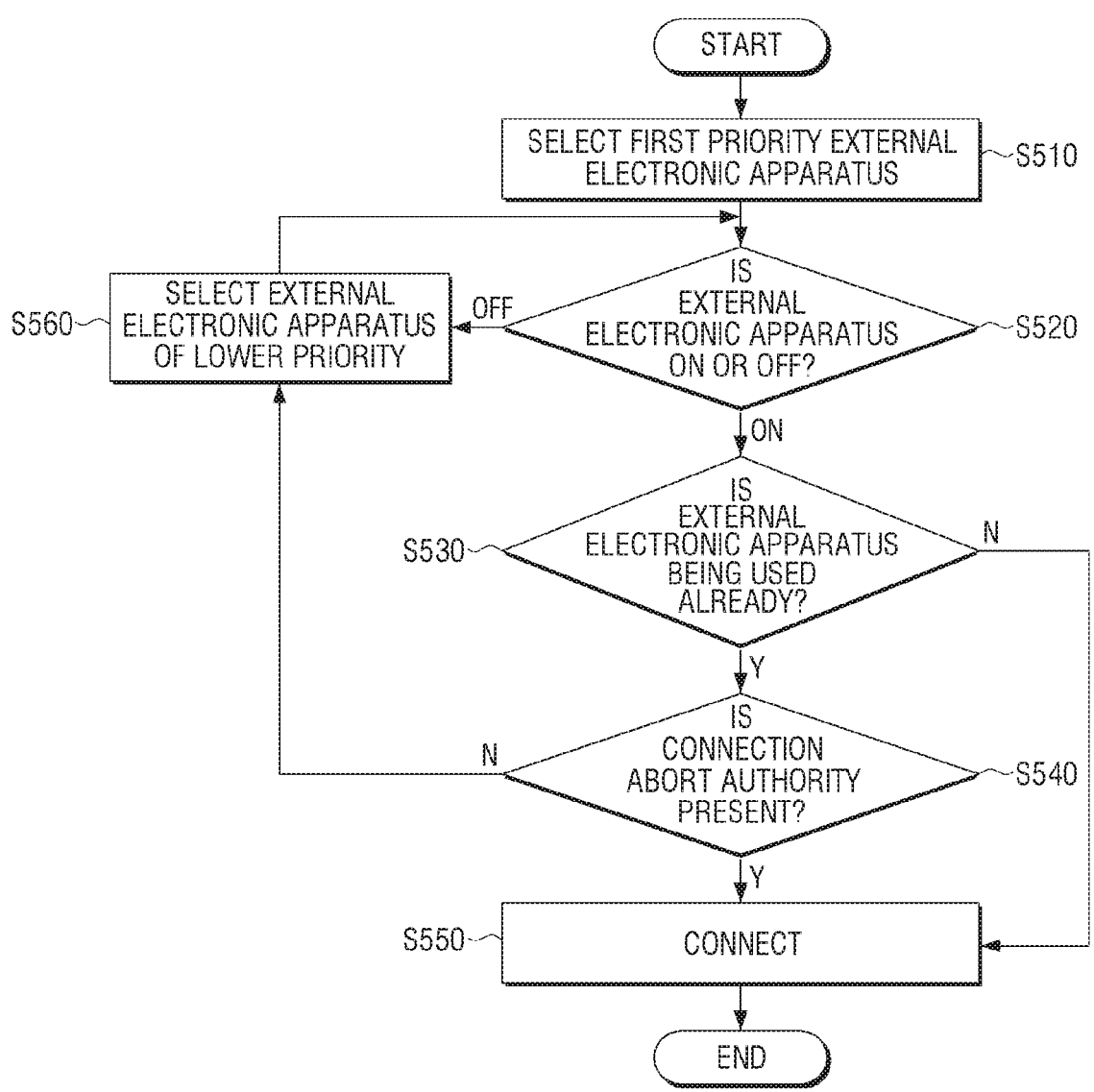
FIG. 5 is a flowchart illustrating a method of identifying whether an external electronic apparatus is available, according to an embodiment.

FIG. 5 is a flowchart illustrating a method of identifying whether an external electronic apparatus is available, according to an embodiment.

First, the processor 130 may select an external electronic apparatus 200 of the highest priority from among a plurality of found external electronic apparatuses, at operation S510. In this regard, the external electronic apparatus 200 of the highest priority may be identified using a preference condition.

In a case in which an external electronic apparatus of the highest priority is selected, the processor 130 may identify an on/off state of a power of the selected external electronic apparatus 200 of the highest priority, at operation S520. When the power is turned off, S520-N, the processor 130 may select an external electronic apparatus 200 of a low priority according to a preference condition, and may identify an on/off state of a power of the external electronic apparatus 200 of the low priority.

When the power is turned on, S520-Y, the processor 130 may identify whether the external electronic apparatus 200 is already used by another electronic apparatus, at operation S530. In a case in which the external electronic apparatus 200 is not used by another electronic apparatus, S530-N, the processor 130 may make a connection attempt to the external electronic apparatus 200, and may control the communication interface 120 to send a lock message, at operation S550. In this regard, if it is a case in which a user identification and authentication is required to use the external electronic apparatus 200, the processor 130 may perform the user identification and authentication process and then, control the communication interface 120 to transmit a lock message, but example is not limited thereto.

In a case in which the external electronic apparatus 200 is used by another electronic apparatus, S530-Y, the processor 130 may identify whether an authority to abort connection of another electronic apparatus is present, at operation S540. When the abort authority is not present, S540-N, the processor 130 may select an external electronic apparatus 200 of a low priority according to a preference condition, and may identify an on/off state of a power of the external electronic apparatus 200 of the low priority.

In a case in which the abort authority is present, S540-Y, the processor 130 may send a message to abort connection between another electronic apparatus and the external electronic apparatus 200, attempt connection with the external electronic apparatus 200, and control the communication interface 120 to send a unlock message, at operation S550.

Meanwhile, whether an authority to abort connection of another electronic apparatus may be identified using various methods.

In addition, in a case in which the electronic apparatus 100 is a master of the external electronic apparatus 200, the connection with another electronic apparatus may be automatically terminated without an authentication process.

In addition, the electronic apparatus 100 may send a message to requesting a connection abort to another electronic apparatus to use the external electronic apparatus 200. For example, the electronic apparatus 100 may control the communication interface 120 to transmit a connection abort message to the external electronic apparatus 200, and the external electronic apparatus 200 may send the received request message to another electronic apparatus. In a case in which another electronic apparatus receiving the connection abort request message approves the request, the processor 130 may make a connection attempt to the external electronic apparatus 200 and control the communication interface 120 to send a lock message, at operation S550.

Figure 6:
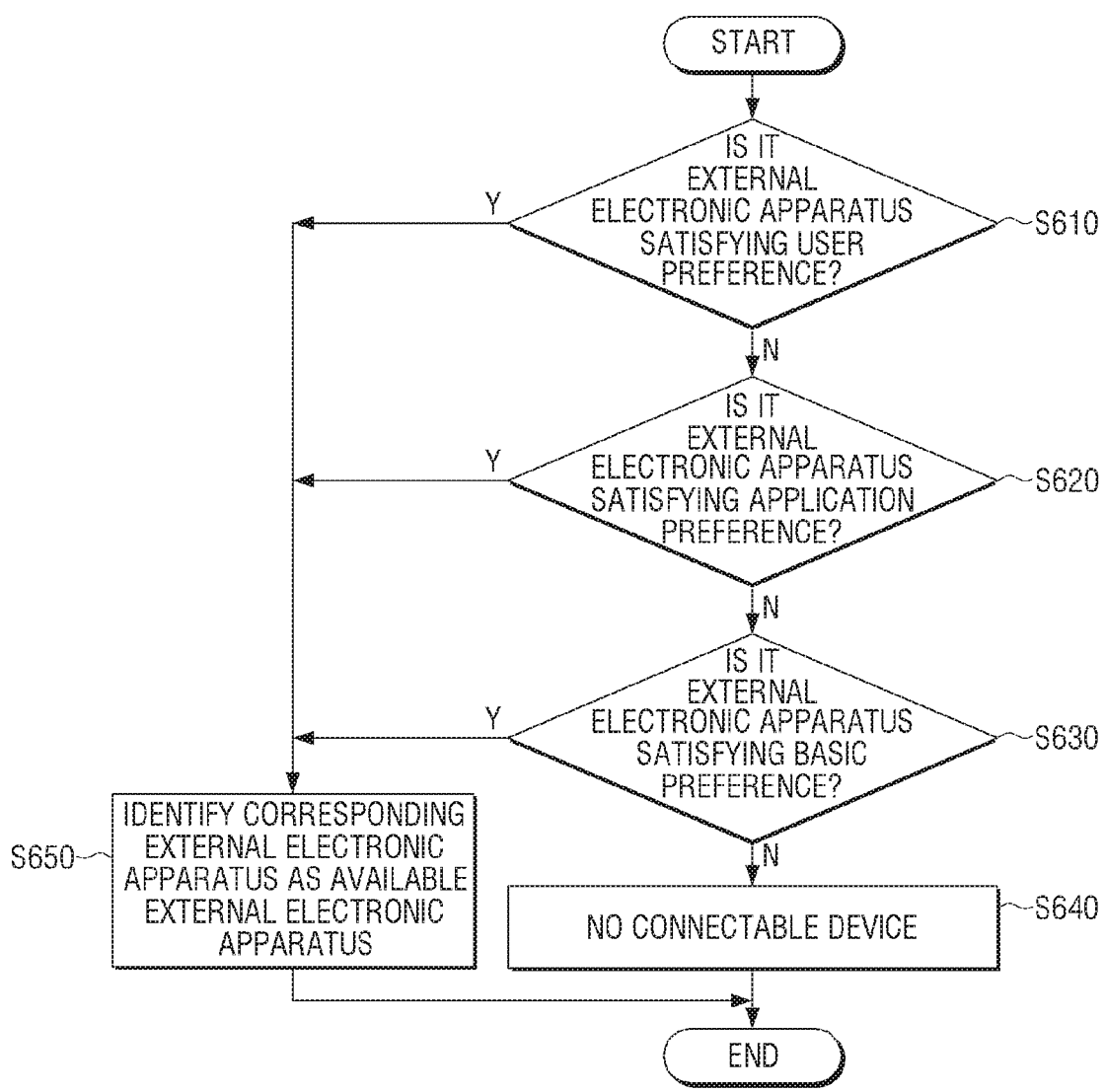
FIG. 6 is a flowchart illustrating a preference condition, according to an embodiment.

FIG. 6 is a flowchart illustrating a preference condition, according to an embodiment.

The processor 130 may select an external electronic apparatus 200 be used according to a predetermined preference condition. In this case, a preference condition may include a user preference condition, an application preference condition, and a basic preference condition. Hereinafter, the user preference condition, the application preference condition, and the basic preference condition will be described in detail. However, it is possible that various preference conditions other than the preference conditions which will be described below, are present.

The processor 130 may search for a plurality of external electronic apparatuses satisfying a user preference condition, at operation S610. In a case in which a plurality of external electronic apparatuses satisfying a user preference condition are present, S610-Y, the processor 130 may identify a first priority external electronic apparatus 200 satisfying the user preference condition from among the plurality of external electronic apparatuses as an available external electronic apparatus 200, at operation S650.

In this case, an external electronic apparatus 200 satisfying a user preference condition may be an external electronic apparatus which is registered in the electronic apparatus 100, or may be an external electronic apparatus which has records of authentication in the external electronic apparatus. For example, the processor may select an external electronic apparatus 200 which is designated to be preferentially used by a user as a highest priority, with respect to all applications. For example, in a case in which the electronic apparatus 100 is a smartphone, a user may pre-designate all applications to select a tablet PC first.

Meanwhile, a user may designate a plurality of external electronic apparatuses 200, and a priority of the plurality of external electronic apparatuses may be designated. For example, in a case in which the electronic apparatus 100 is a smartphone, the user may designate that an order of external electronic apparatuses to be connected is a tablet PC, a notebook PC, a desktop PC and a smartphone PC, with respect to all applications.

Meanwhile, in a case in which the external electronic apparatus 200 is used using an authentication process, the processor 130 may select an external electronic apparatus 200 having an authentication records history. In a case in which a plurality of external electronic apparatuses have an authentication record, the processor 130 may preferentially select an external electronic apparatus 200 having the largest number of authentications. However, the example is not limited to this method. From among a plurality of external electronic apparatuses in which an authentication record exists, an external electronic apparatus designated by a user may be preferentially selected, and a preference may be determined according to various standards.

In a case in which some of the plurality of external electronic apparatuses are an external electronic apparatus designated by a user and the others are an external electronic apparatus in which the authentication record history exists, the processor 130 may set the external electronic apparatus designated by the user to be a first priority and set the external electronic apparatus in which an authentication record exists to be have a lower priority. However, the example is not limited to this method. The processor 130 may also identify that the electronic apparatus in which an authentication record exists as a first priority and that the external electronic apparatus designated by the user to have a lower priority. In addition, it is possible that a priority may be determined by combining the user designated condition and an authentication record condition.

In a case in which an electronic apparatus satisfying a user preference condition is not present, S610-N, the processor 130 may search for an external electronic apparatus which satisfies an application preference condition, at operation S620. In a case in which a plurality of external electronic apparatuses satisfying the application preference condition are present, S620-Y, the processor 130 may identify a first priority external electronic apparatus 200 satisfying the application preference condition from among the plurality of external electronic apparatuses as an available external electronic apparatus 200, at operation S650.

In this case, an external electronic apparatus 200 satisfying the application preference condition may be determined according to a resource priority. Each application may include a script for calculating a resource priority, and a rank of a plurality of external electronic apparatuses may be identified according to content stored in the script. In this case, a resource priority may be a rank among resources required to execute an application or may be a rank of a particular resource.

For example, in a case in which the electronic apparatus 100 executes a navigation application, a hardware resource required to execute the navigation application may be a display or an input interface. In a case in which an application script identifies that the display is first priority and that the input interface is a lower priority, the processor 130 may select an apparatus appropriate for a display condition as an external electronic apparatus 200.

Figure 7A:
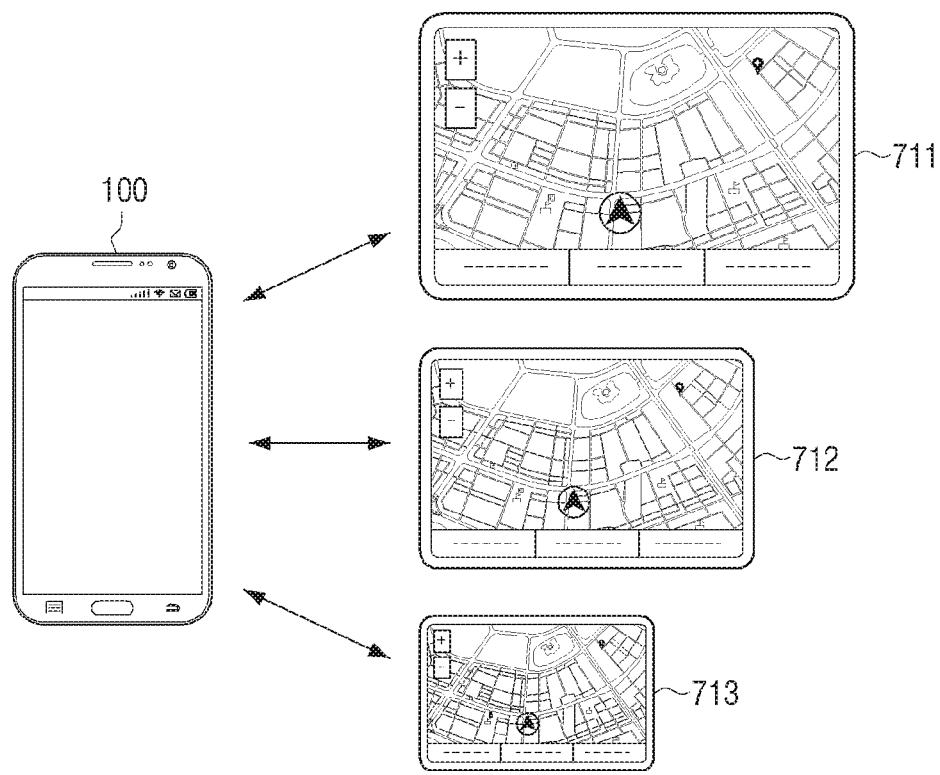
FIGS. 7A, 7B and 7C are diagrams illustrating an example method of selecting a first priority external electronic apparatus corresponding to a preference condition, according to an embodiment.
Figure 7B:
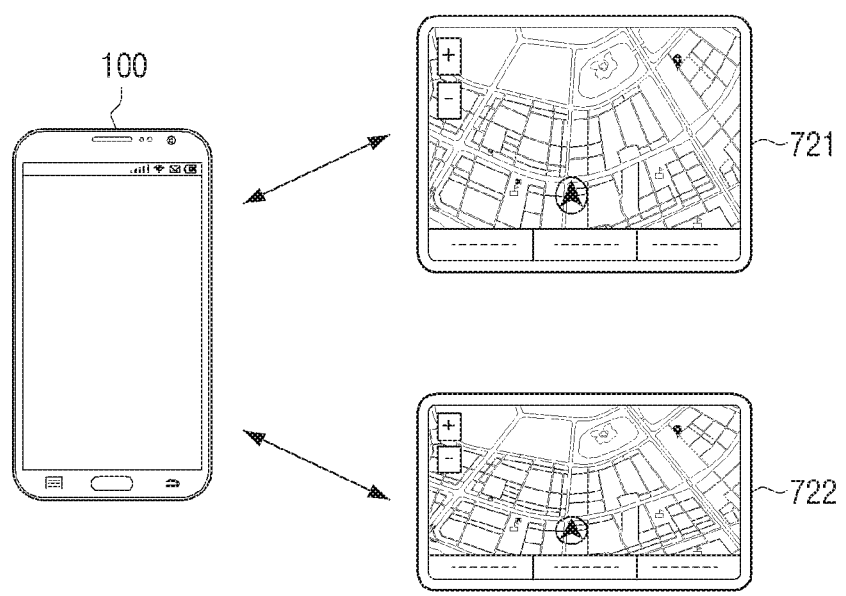

For example, as illustrated in FIG. 7A, in a case in which a plurality of external electronic apparatuses are a first external electronic apparatus 711, a second external electronic apparatus 712, and a third external electronic apparatus 713, the processor 130 may select the first external electronic apparatus 711 having the largest display screen as an external electronic apparatus 200. In other words, a priority of a plurality of selected external electronic apparatuses may be identified based on a size of a display screen. However, the example is not limited thereto, and an external electronic apparatus 200 having a display of the most similar size as a display of a particular size may be selected primarily. In addition, in a case in which a size of a display is unknown, a first priority external electronic apparatus 200 may be identified based on a resolution. In addition, as illustrated in FIG. 7B, a first priority external electronic apparatus may be identified based on an aspect ratio of a display. For example, in a case in which an application script identifies that a fourth external electronic apparatus 321 having an aspect ratio of 4:3 as a first priority electronic apparatus, the processor 130 may identify the fourth external electronic apparatus 321 as an external electronic apparatus. Alternatively, in a case in which the application script identifies that a fifth external electronic apparatus 323 having an aspect ratio of 16:9 as a first priority electronic apparatus, the processor 130 may identify that the fifth external electronic apparatus 322 as an external electronic apparatus.

In a case in which it is impossible to determine an external electronic apparatus by a display condition, the processor 130 may identify one external electronic apparatus 200 based on an input interface of a plurality of external electronic apparatuses. For example, the processor 130 may identify that an external electronic apparatus having a touch screen input method as a first priority and that an external electronic apparatus having a button input method as a second priority.

Figure 7C:
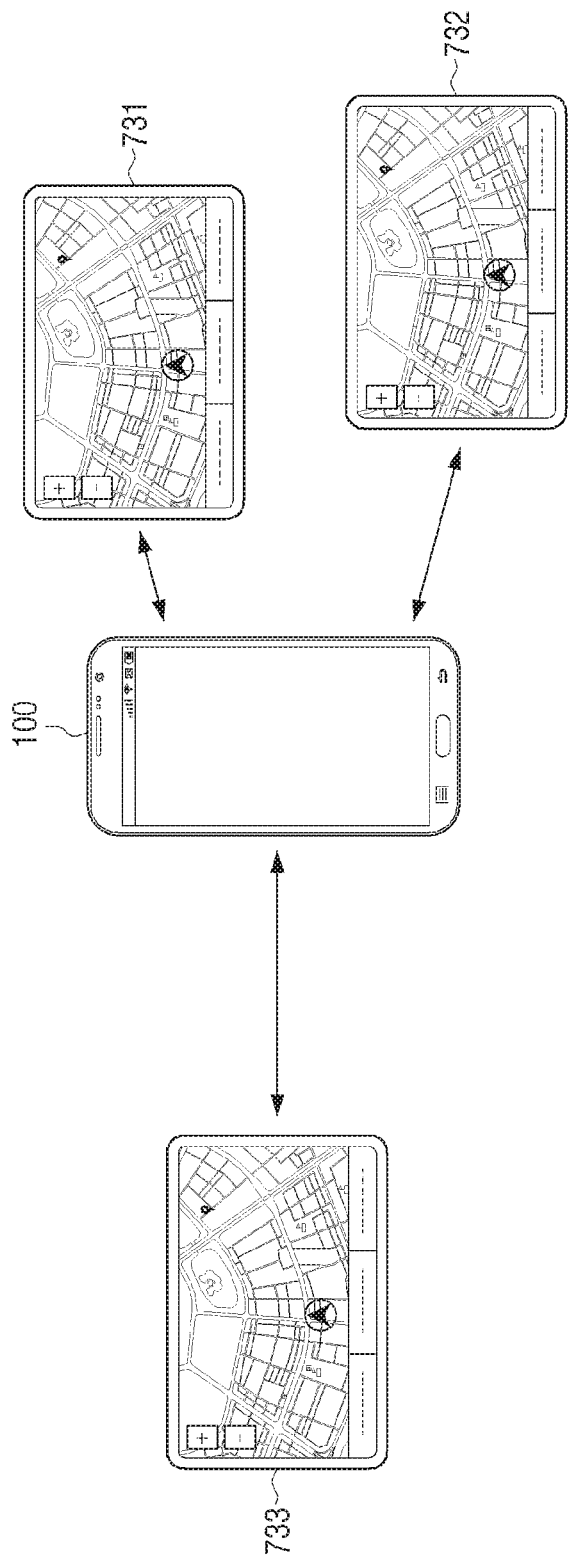

In a case in which it is impossible to determine an external electronic apparatus by a display condition and an input interface condition, the processor 130 may identify one external electronic apparatus 200 based on a position of a plurality of external electronic apparatuses. For example, as illustrated in FIG. 7C, the processor 130 may identify that a sixth external electronic apparatus 731 which is at the closest position to the electronic apparatus 100 from among the sixth external electronic apparatus 731, a seventh external electronic apparatus 732, and an eighth external electronic apparatus 733 is one external electronic apparatus 200.

In a case in which an electronic apparatus satisfying an application preference condition is not present, S620-N, the processor 130 may search for an external electronic apparatus satisfying a basic preference condition, at operation S630. In a case in which a plurality of external electronic apparatuses satisfying the basic preference condition are present, S630-Y, the processor 130 may identify a first priority external electronic apparatus 200 satisfying the application preference condition from among the plurality of external electronic apparatuses as an available external electronic apparatus 200, at operation S650.

In this regard, the external electronic apparatus 200 satisfying the basic preference condition may be an arbitrary electronic apparatus, in a case in which neither an external electronic apparatus corresponding to the user preference information nor an external electronic apparatus corresponding to the application preference condition is present.

Figure 8A:
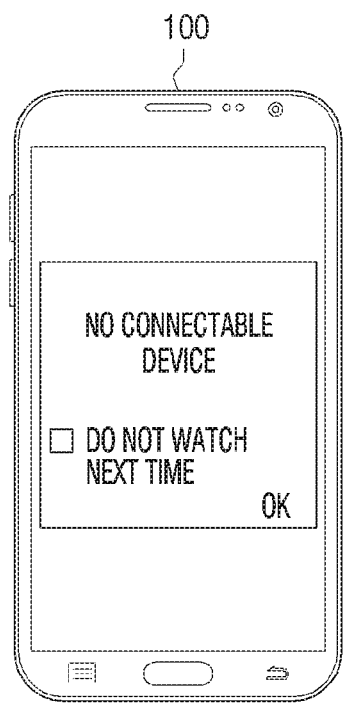
FIGS. 8A and 8B are diagrams illustrating a UI of an electronic apparatus when the electronic apparatus is connected with an external electronic apparatus according to an embodiment.

In a case in which an electronic apparatus satisfying the basic preference condition is not present, S630-N, the processor 130 may identify that a currently connectable external electronic apparatus is not present, at operation S640. In this case, as illustrated in FIG. 8A, the processor 130 may control the display 140 to display a UI indicating that a connectable external electronic apparatus is not present.

Figure 8B:
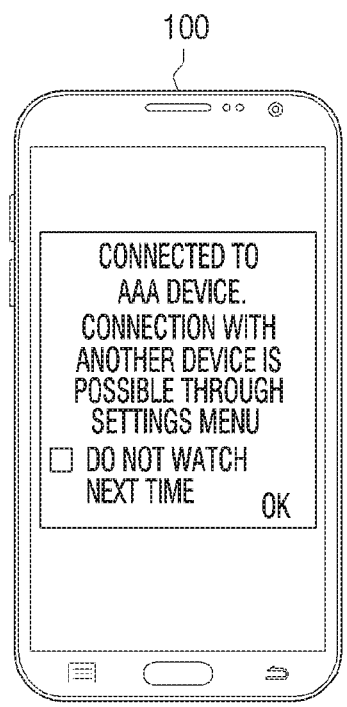

Meanwhile, as illustrated in FIG. 8B, a user may manually select an external electronic apparatus. In a case in which an application is executed, the processor 130 may connect to the first priority external electronic apparatus 200 satisfying a preference condition, and may control the display 140 to display a UI indicating the connection. For example, the display 140 may provide information relating to a currently connected external electronic apparatus 200 and provide a method for changing an external electronic apparatus.

Meanwhile, a preference priority condition described with reference to FIGS. 6, 7A, 7B, 7C, 8A and 8B may be identified using various methods according to a type of the electronic apparatus 100 and the external electronic apparatus 200 and a type of application, but the example is not limited thereto.

Figure 9:
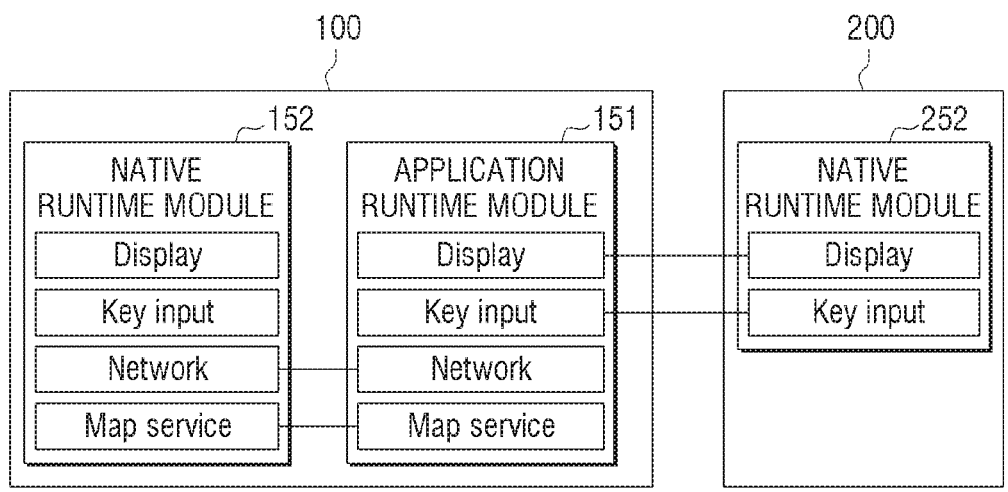
FIG. 9 is a diagram illustrating an example method of sending a message by using a mapping table, according to an embodiment.

FIG. 9 is a diagram illustrating an example method of sending and receiving a message by using a mapping table, according to an embodiment.

As illustrated in FIG. 9, the electronic apparatus 100 may include an application runtime module 151 and a native runtime module 152. The external electronic apparatus 200 may include a native runtime module 252. However, the example is not limited to elements illustrated in FIG. 9, and elements illustrated in FIG. 2B may be added to the electronic apparatus 100 and the external electronic apparatus 200.

Meanwhile, in an embodiment, a mapping table may be stored in the application runtime module of the electronic apparatus 100.

In a case in which the electronic apparatus identifies that the external electronic apparatus 200 is an electronic apparatus which conforms to a preference condition, a mapping table between the electronic apparatus 100 and the external electronic apparatus 200 may be generated. In this regard, the mapping table may include information relating to a resource required by an application to be executed. For example, as illustrated in FIG. 9, in a case in which the electronic apparatus 100 is to execute a navigation application, a display resource, key input resource, network resource and map service resource required for execution may be stored in the mapping table.

In a case in which a configuration relating to a resource required to execute the application is obtained, the electronic apparatus 100 may identify in which apparatus the resources stored in the mapping table is to be used. For example, the electronic apparatus 100 may map the display resource and key input resource of the mapping table to the native runtime module 251 of the external electronic apparatus 200 and map the network resource and map service resource of the mapping table to the native runtime module 151 of the electronic apparatus 100.

In a case in which a mapping table is generated, the electronic apparatus 100 may send and receive a message by using the mapping table. As described above, a message may control the external electronic apparatus 200 but also may be used to control the electronic apparatus 100.

In this case, each resource of the electronic apparatus 100 and the external electronic apparatus 200 is mapped by a mapping table and thus, in a case in which an event relating to a resource occurs, a message may be transferred using information mapped to the mapping table.

For example, in a case in which a map service of a navigation application is to be used by means of the external electronic apparatus 200, a user may input a control command to display the map service via an input interface of the external electronic apparatus 200. In this regard, the external electronic apparatus 200 may send a message to request the map service to the electronic apparatus 100.

The electronic apparatus 100 receiving the message from the external electronic apparatus 200 may send a message to the mapping table. In this regard, a map service resource of the mapping table is mapped to a map service resource of the native runtime module 150 of the electronic apparatus 100 and thus, the message may be sent to the map service resource of the native runtime module 150.

Likewise, the native runtime module 151 of the electronic apparatus 100 receiving a map service request message may send a message to a display resource of the native runtime module 251 of the external electronic apparatus 200 through the mapping table.

As described above, the electronic apparatus 100 may use a resource of the external electronic apparatus 200 by using a mapping table, and may send a message to use a resource of the external electronic apparatus 200.

In the above embodiment, a display resource and a key input resource are mapped to an external electronic apparatus, but the example is not limited thereto. For example, the display resource and the key input resource may be mapped to both a display resource and key input resource of the electronic apparatus 100 and a display resource and key input resource of the external electronic apparatus 200. In this case, a user may use the display resource and key input resource of both the electronic apparatus 100 and the external electronic apparatus 200.

FIG. 10 is a flowchart illustrating a method for controlling an electronic apparatus, according to an embodiment.

An electronic apparatus 100 may execute an application to use a function, at operation S1010. When the application is executed, the processor 130 may acquire a resource configuration required to execute the application, at operation S1020. In this regard, a resource configuration may include at least one of a preference condition, a mapping table, and information relating to an application execution environment. The mapping table may map a resource of the external electronic apparatus corresponding to a resource of the electronic apparatus.

In a case in which information relating to a plurality of external electronic apparatuses pre-stored in the acquired resource configuration is present, the processor 130 may identify one external electronic apparatus 200 from among the plurality of external electronic apparatuses 200 based on preference information, at operation S1030.

The processor 130 may identify whether the identified external electronic apparatus 200 is available and may connect with one external electronic apparatus, at operation S1040. In a case in which the identified external electronic apparatus is not available, the processor 130 may select a posterior external electronic apparatus and identify whether the selected external electronic apparatus 200 is available.

The processor 130 may send a message relating to an application to the connected external electronic apparatus. For example, in a case in which the electronic apparatus 100 is connected with the external electronic apparatus 200, the processor 130 may control the communication interface 120 to send a lock message to prevent the external electronic apparatus 200 from being used by another electronic apparatus.

In the above embodiment, an external electronic apparatus 200 which is connected in a case where a navigation application is executed is described, but the example is not limited thereto.

In an embodiment, when an application executed in the electronic apparatus 100 is a music player application, the external electronic apparatus 200 may include one from among a speaker apparatus and a digital TV apparatus.

In another embodiment, when an application executed in the electronic apparatus 100 is a documentation application, the external electronic apparatus 200 may include one from among a notebook PC, a desktop PC, and a tablet PC.

In another embodiment, when an application executed in the electronic apparatus 100 is a camera application, the external electronic apparatus 200 may include one from among a digital camera, a mirrorless camera, and an electronic apparatus including a camera function.

In the above embodiment, the electronic apparatus 100 is connected to one external electronic apparatus 200 from among a plurality of external electronic apparatuses, but the example is not limited thereto.

In an embodiment, when an application executed in the electronic apparatus 100 is a video call application, the external electronic apparatus 200 may include an electronic apparatus including all of a microphone, earphones, and a display.

In another embodiment, when an application executed in the electronic apparatus 100 is a game application, the external electronic apparatus 200 may include all of an electronic apparatus including a display, a speaker apparatus and a game pad.

Meanwhile, the method of controlling an electronic device according to the above-described various embodiments may be realized as a program and provided in the user terminal device. To be specific, a non-transitory computer readable medium at which a program which includes a method of controlling a terminal device is stored therein may be provided.

The non-transitory computer readable medium refers to a medium that stores data semi-permanently rather than storing data for a very short time, such as a register, a cache, a memory or etc., and is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are not to be construed as limiting the present disclosure. The present teaching can be readily applied to other types of apparatuses. Also, the description of the embodiments is intended to be illustrative, and not to limit the scope of the claims, and many alternatives, modifications, and variations will be apparent to persons having ordinary skill in the art.

What is claimed is:

1. A method for controlling an electronic apparatus, the method comprising:
   executing an application;
   acquiring a resource configuration corresponding to the application, the resource configuration comprising preference information, information on at least one resource required to execute the application and information on resources of each of a plurality of external electronic apparatuses, wherein the information on the resources of each of the plurality of external electronic apparatuses indicates a hardware configuration of an external electronic apparatus corresponding thereto;
   based on the at least one resource required to execute the application and the resources of the plurality of external electronic apparatuses, identifying at least one external electronic apparatus with the at least one resource from among the plurality of external electronic apparatuses;
   based on the preference information and the hardware configuration of the plurality of external electronic apparatuses, selecting an external electronic apparatus from among the identified at least one external electronic apparatus;
   establishing a connection with the selected external electronic apparatus; and
   sending a message for using the at least one resource required to execute the application to the selected external electronic apparatus via the connection.

2. The method as claimed in claim 1, wherein the preference information includes first priority information, second priority information, and third priority information, and
   wherein the selecting comprises identifying, based on the preference information, a highest priority external electronic apparatus with the at least one resource as the selected external electronic apparatus.

3. The method as claimed in claim 2, wherein the first priority information indicates a first external electronic apparatus corresponding to user preference information,
   wherein the second priority information indicates a second external electronic apparatus corresponding to application preference information, and
   wherein the third priority information indicates a third external electronic apparatus corresponding to basic preference information.

4. The method as claimed in claim 3, wherein the first external electronic apparatus corresponds to at least one from among an external electronic apparatus registered with the electronic apparatus and an external electronic apparatus which has an authentication history in the electronic apparatus, wherein the second external electronic apparatus corresponds to a resource priority included in the application, wherein the third external electronic apparatus corresponds to an available external electronic apparatus, and wherein the resource priority is pre-stored in the application.

5. The method as claimed in claim 1, wherein the resource configuration includes at least one from among a mapping table, and information relating to an application execution environment, and wherein the mapping table maps resources of the plurality of external electronic apparatuses corresponding to a resource of the electronic apparatus.

6. The method as claimed in claim 1, wherein the identifying further comprises:

searching for a plurality of found external electronic apparatuses including a resource required to execute the application based on information relating to the plurality of external electronic apparatuses not being present in the resource configuration;

identifying the selected external electronic apparatus from among the plurality of found external electronic apparatuses based on the preference information; and generating a mapping table corresponding to the selected external electronic apparatus.

7. The method as claimed in claim 1, wherein the establishing the connection comprises identifying whether a power state of the external electronic apparatus is on and identifying whether the external electronic apparatus is connected with another electronic apparatus.

8. The method as claimed in claim 7, wherein the establishing the connection further comprises:

identifying whether an authority to abort connection between the external electronic apparatus and the another electronic apparatus is present based on the external electronic apparatus being connected with the another electronic apparatus; and aborting connection between the another electronic apparatus and the external electronic apparatus and connecting with the external electronic apparatus based on the authority being present.

9. The method as claimed in claim 1, wherein the sending comprises:

sending a mapping table of a resource of the selected external electronic apparatus; and sending one from among a lock message to prohibit use of another electronic apparatus and a share message to share the selected external electronic apparatus with another device based on the connection with the selected external electronic apparatus being established.

10. An electronic apparatus, comprising:

an input interface configured to receive a user command;

a processor configured to:

execute an application based on the user command;

acquire a resource configuration corresponding to the application, the resource configuration comprising preference information on at least one resource required to execute the application, and information on resources of each of a plurality of external electronic apparatuses, wherein the information on the resources of each of the plurality of external electronic apparatuses indicates a hardware configuration of an external electronic apparatus corresponding thereto;

based on the at least one resource required to execute the application and the resources of the plurality of external electronic apparatuses, identify at least one external electronic apparatus with the at least one resource from among the plurality of external electronic apparatuses;

based on the preference information and the hardware configuration of the plurality of external electronic apparatuses, select an external electronic apparatus from among the identified at least one external electronic apparatus; and a communication interface configured to connect with the selected external electronic apparatus when the selected external electronic apparatus is available, wherein the processor is further configured to control the communication interface to send a message for using the at least one resource required to execute the application to the selected external electronic apparatus.

11. The electronic apparatus as claimed in claim 10, wherein the preference information includes first priority information, second priority information, and third priority information, and wherein the processor is further configured to identify a highest priority external electronic apparatus, that is available, based on the preference information as the selected external electronic apparatus.

12. The electronic apparatus as claimed in claim 11, wherein the first priority information indicates a first external electronic apparatus corresponding to user preference information, wherein the second priority information indicates a second external electronic apparatus corresponding to application preference information, and wherein the third priority information indicates a third external electronic apparatus corresponding to basic preference information.

13. The electronic apparatus as claimed in claim 12, wherein the first external electronic apparatus corresponds to at least one from among an external electronic apparatus registered with the electronic apparatus and an external electronic apparatus which has an authentication history in the electronic apparatus, wherein the second external electronic apparatus corresponds to a resource priority included in the application, wherein the third external electronic apparatus corresponds to an available external electronic apparatus, and wherein the resource priority is pre-stored in the application.

14. The electronic apparatus as claimed in claim 10, wherein the resource configuration includes at least one from among a mapping table, and information relating to an application execution environment, and wherein the mapping table maps a resource of the external electronic apparatus corresponding to a resource of the electronic apparatus.

15. The electronic apparatus as claimed in claim 10, wherein the processor is further configured to search for a plurality of found external electronic apparatuses including a resource required to execute the application based on information relating to the plurality of external electronic apparatuses not being present in the resource configuration, identify the selected external electronic apparatus from among the plurality of found external electronic apparatuses based on the preference information, and generate a mapping table corresponding to the selected external electronic apparatus.

16. The electronic apparatus as claimed in claim 10, wherein the processor is further configured to identify whether a power state of the external electronic apparatus is on and identify whether the external electronic apparatus is connected with another electronic apparatus.

17. The electronic apparatus as claimed in claim 16, wherein the processor is further configured to identify whether an authority to abort connection between the external electronic apparatus and the another electronic apparatus is present based on the external electronic apparatus being connected with the another electronic apparatus, and abort connection between the another electronic apparatus and the external electronic apparatus and connect with the external electronic apparatus based on the authority being present.

18. The electronic apparatus as claimed in claim 10, wherein the processor is further configured to control the communication interface to send a mapping table of a resource of the selected external electronic apparatus, and control the communication interface to send one from among a lock message to prohibit use of another electronic apparatus and a share message to share the selected external electronic apparatus with another device based on connecting with the selected external electronic apparatus.

19. The method as claimed in claim 1, wherein the information on the resources of each of the plurality of external electronic apparatuses indicates size of a display screen of the external electronic apparatus corresponding thereto, an input interface of the external electronic apparatus corresponding thereto and a position of the external electronic apparatus corresponding thereto,
wherein the preference information indicates a preferred display condition, a preferred input interface a preferred location, and
wherein the selecting comprises:
identifying a highest priority external electronic apparatus with the preferred display condition as the selected external electronic apparatus;
identifying a highest priority external electronic apparatus with the preferred input interface as the selected external electronic apparatus based on none of the identified at least one external electronic apparatus having the preferred display condition; and
identifying a highest priority external electronic apparatus corresponding to the preferred location as the selected external electronic apparatus based on none of the identified at least one external electronic apparatus having the preferred display condition or the preferred input interface.

20. The electronic apparatus as claimed in claim 10, wherein the information on the resources of each of the plurality of external electronic apparatuses indicates size of a display screen of the external electronic apparatus corresponding thereto, an input interface of the external electronic apparatus corresponding thereto and a position of the external electronic apparatus corresponding thereto,
wherein the preference information indicates a preferred display condition, a preferred input interface a preferred location, and
wherein the processor is further configured to select the external electronic apparatus by:
identifying a highest priority external electronic apparatus with the preferred display condition as the selected external electronic apparatus;
identifying a highest priority external electronic apparatus with the preferred input interface as the selected external electronic apparatus based on none of the identified at least one external electronic apparatus having the preferred display condition; and
identifying a highest priority external electronic apparatus corresponding to the preferred location as the selected external electronic apparatus based on none of the identified at least one external electronic apparatus having the preferred display condition or the preferred input interface.

* * * * *